1

3,448,494
FASTENING DEVICES NOTABLY FOR SECURING
BEADINGS TO THE BODIES OF VEHICLES
Bernard Boyenval and Albert Labbe, Billancourt, France,
assignors to Regie Nationale des Usines Renault and
Societe Industrielle et Commerciale des Automobiles
Peugeot, Paris, France
Filed May 29, 1967, Ser. No. 641,992
Claims priority, application France, July 15, 1966,
69,503
Int. Cl. F16b 17/00
U.S. Cl. 24—73    3 Claims

ABSTRACT OF THE DISCLOSURE

Fastener for rapidly securing an element to another element, notably a molding on a panel of an automotive or other vehicle, characterised by a rivet having its head engaged in said molding for pressing same against said panel, said molding being clamped against said panel by a lock washer slipped on the rivet shank and having a dished configuration with an outer peripheral portion turned down to provide a substantially toroidal curved surface which has a height greater than that of said rivet shank.

---

The present invention relates to a device for quickly fastening an element to another element, for example a chrome molding or the like to a panel, notably in the automotive industry.

It is known that a conventional fastener of this general character consists of a rivet the head of which cooperates with a recess of the beading, the cylindrical body or shank of this rivet engaging an orifice formed in said panel and being held in position by a washer or small plate made from a material somewhat harder than the rivet material and formed with a passage comprising anchoring means permitting the engagement or slipping of the washer or plate on the rivet shank but preventing the removal of this washer or plate.

A known inconvenience of a fastener of this general type is that the shank of the rivet projects more or less beyond the lock washer or plate, and therefore if the panel engaged by the rivet is the inner wall of an automobile trunk, for example, this shank projects dangerously and may hurt the user during the handling of objects or luggage in the trunk, not to mention the possibility of damaging these objects or luggage.

Another drawback characterising this known type of fastener resides in the difficulty of engaging the lock washer or plate on the rivet, as the former has no gripping surfaces permitting a stable, firm holding, notably when no special tools are available therefor and the operation is performed manually.

It is the essential object of the present invention to avoid these inconvenience by providing a fastener of the general type broadly set forth hereinabove which is characterised essentially in that the lock washer or plate comprises a turn-down-marginal portion of a height greater than the length of the rivet body or shank portion which projects from said panel. Thus, a fastener is obtained of which the portion emerging from the inner surface of a panel, for example the inner wall of a truck, is harmless and cannot scratch or damage the objects kept in the truck. Moreover, the lock washer or plate can easily be slipped on the rivet by hand, like a dome-fastener. Finally, if a tool is used for fitting the fastener, it will easily fit in, and be centered by, the inner cavity of the aforesaid turn-down marginal portion of the lock washer or plate.

Figure 1:
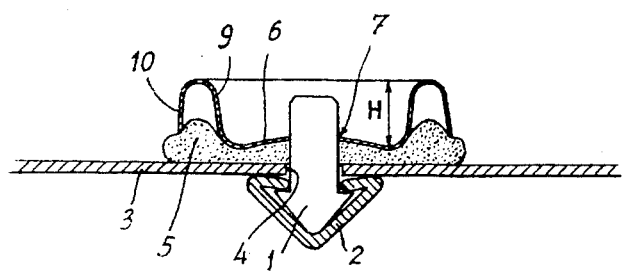
Figure 2:
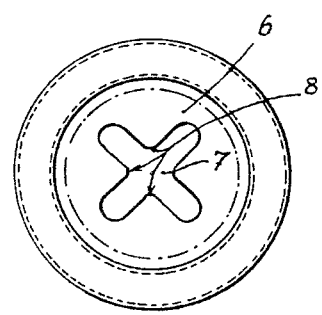

In order to afford a clearer understanding of this invention and of the manner in which the same may be carried out in practice, reference will now be made to the accompanying drawing wherein:

FIGURE 1 is an axial section of a fastener for securing a molding to a panel, and FIGURE 2 is a plan view from above of the lock washer of FIGURE 1.

Referring now to the drawing and more particularly to FIGURE 1, the fastening rivet 1 engaged in the molding 2 extends through a hole 4 of the panel 3 to which this molding is to be secured.

The shank of rivet 1 projects from the panel side opposite to the one engaged by the molding 2. To keep this rivet in the position causing the molding to be clamped against the panel 3, a lock washer 6 slipped on the rivet shank is used, a sealing gasket 5 being interposed beforehand between the washer 6 and panel 3.

In a specific arrangement constituting a preferred form of embodiment of this invention the lock washer 6 is dished and its marginal portion 9 turned down as at 10 has a U-shaped radial section.

This lock washer 6 comprises a spider-shaped central orifice 7 fitting on the shank of rivet 1, the inner corners 8 of this spider-shaped orifice 7 constituting efficient means for locking said shank.

The outer turn-down portion 10 of the washer provides a substantially toroidal configuration smooth enough to eliminate the risk of hurting the user.

The height H of the outer peripheral portion of washer 6 is such that when the fastener is fitted and holds the molding 2 against the panel 3 the rivet shank does not project from said peripheral portion to the inside.

It is clear that a fastener of this type, wherein the rivet shank does not project beyond the marginal portion of the lock washer, is harmless, for example on the inner wall of the trunk of a passenger or other vehicle, and that the marginal portion of this washer, due to its rounded radial sectional contour, cannot damage or scratch the objects contained in the trunk or hurt the users thereof.

We claim:

1. A fastener for rapidly securing a first element, such as a molding, on a second element, such as a panel of an automotive vehicle comprising a rivet having a head portion and an integral shank portion, said head portion being engaged with said first element and said shank portion passing through said second element, lock washer means grippingly mounted on said shank and pressing against said second element for clamping said first element against said second element, said lock washer having a dished configuration with an outer peripheral portion turned down to provide a substantially toroidal curved surface, and to provide a channel for receiving the portion of a sealing gasket surrounding the rivet shank portion which is forced thereunto by engagement of the dished portion of the lock washer with the gasket during tightening of the fastener.

2. A fastener according to claim 1 in which said lock washer has a spider-shaped central orifice the inner corners of which are adapted to grippingly retain said shank of the rivet.

3. A fastener according to claim 1 in which said substantially toroidal curved surface has a height greater than that of said rivet shank.

References Cited

UNITED STATES PATENTS

| 2,834,235 | 5/1958 | Sarti | 85—36 X |
|---|---|---|---|
| 2,913,950 | 11/1959 | Tinnerman | 85—36 X |
| 3,150,556 | 9/1965 | Churchill | 85—36 X |
| 3,273,441 | 9/1966 | Biesecker | 24—73 |
| 2,266,049 | 12/1941 | Kost | 85—36 |
| 2,796,647 | 6/1957 | Bedford. | |
| 2,955,690 | 10/1960 | Bedford | 52—718 |
| 3,200,551 | 8/1965 | Jakeway | 52—717 X |
| 3,036,793 | 5/1962 | Becker | 85—36 X |

FOREIGN PATENTS

| 932,270 | 7/1963 | Great Britain. |
|---|---|---|
| 1,036,103 | 7/1966 | Great Britain. |

DONALD A. GRIFFIN, *Primary Examiner.*

U.S. Cl. X.R.

52—718; 85—36